Dec. 3, 1935.  H. M. BIEBEL  2,023,114
RANGE CONTROL SYSTEM
Filed March 30, 1934
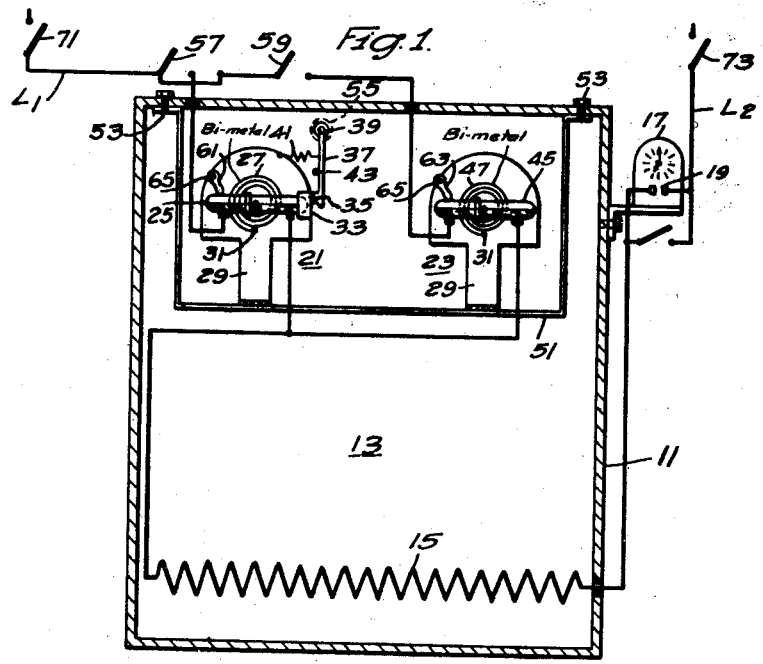
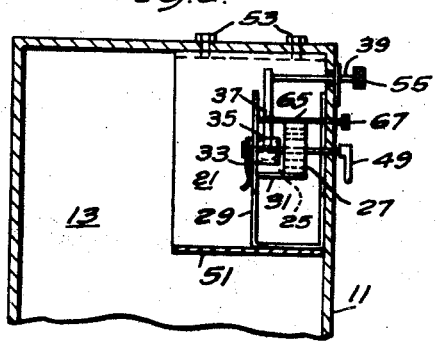
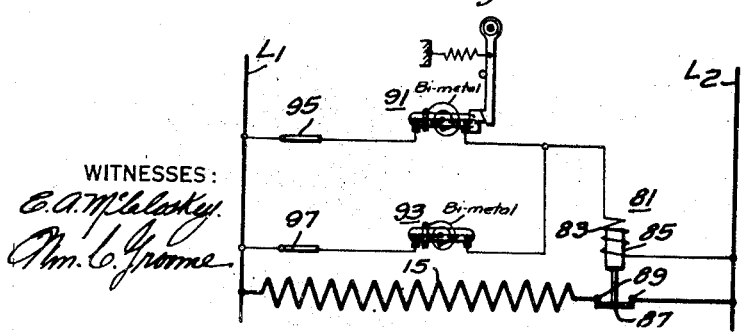
WITNESSES:
E. A. McCloskey
Wm. C. Groome
INVENTOR
Herman M. Biebel
BY
W. R. Coley
ATTORNEY Patented Dec. 3, 1935

2,023,114

UNITED STATES PATENT OFFICE 2,023,114

RANGE CONTROL SYSTEM

Herman M. Biebel, Oakmont, Pa., assignor to Westinghouse Electric & Manufacturing Company, East Pittsburgh, Pa., a corporation of Pennsylvania Application March 30, 1934, Serial No. 718,273

12 Claims. (Cl. 219—20)

My invention relates to electric ranges and particularly to control systems for the ovens of electric ranges.

The main object of my invention is to provide relatively simple, inexpensive, and easily and quickly installable apparatus for selectively obtaining any one of a number of different time-temperature cycles in a cooking chamber.

Another object of my invention is to provide a thermo-electric control system for a cooking chamber that shall comprise a minimum number of component parts or elements.

Other objects of my invention will either be apparent from the following description of the elements entering into my invention and of their operation, or will be more specifically pointed out hereinafter.

In practicing my invention, I provide, in combination or in cooperation with, a cooking chamber having a heating element therein, which is controlled to obtain any one of a plurality of different time-temperature cycles through the agency of a single-cycle thermally-actuable switch assembly and a plural-cycle thermally-actuable switch assembly, which severally control the energization of the heating element. For this purpose, the two switches are electrically connected in parallel, and the single-cycle switch is provided with latching means to hold it in its open position after its first actuation to such position.

Reference is here made to applicant's copending applications relating to similar subject matter, Serial Numbers 718,272, 718,274, 718,275, 718,276, 718,277; filed concurrently herewith and also to an application by F. S. Wheeler, Serial No. 718,278.

Two time-temperature cycles used with or in the cooking chambers of electric ranges, such as the oven, are already well known. One of these is that in which an electric heating element is energized at a certain time by time-controlled or manually-controlled means, the temperature in the cooking chamber being raised until a thermal device located therein reaches a predetermined temperature, which may be on the order of 500° F. or over, at which temperature the surface of a roast located in the cooking chamber will have been seared. A circuit interrupter controlled by the thermal device, this circuit interrupter being separate from the one closed initially to energize the heating element, is opened, and the rest of the necessary cooking of the roast is effected by stored heat.

Another method widely used is that in which a thermal element is operatively associated with the cooking chamber of an electric range, and controls a suitable circuit controller for the heating element, whereby the heating element is intermittently sequentially energized and deenergized to maintain a certain average temperature in the cooking chamber.

My invention has more particularly to do with a temperature cycle in the cooking chamber which combines both of these older cycles in that the temperature is raised, by the heating element, to a momentary peak temperature, whereupon the heating element is deenergized, after which, when the chamber temperature has dropped to a lower value, say, 300° F., it is maintained at substantially that value for the rest of the time necessary to properly cook the roast.

It is obvious that the use of a thermal control element located in the oven chamber and following the temperature variations, either of the chamber or of the material being cooked, is a very effective device to be used in the control of the heating element. This is for the reason particularly, that, as the amount of energy translated into heat in the heating element is usually fixed, the length of time necessary to sear a roast will depend upon the weight of the roast itself, that is, the larger the roast, the longer will it require to have the chamber temperature or the temperature of the thermal element reach a value of 500° F., at which temperature the heating element is temporarily deenergized, such deenergization continuing until the lower predetermined sustained or maintained temperature is reached.

In the accompanying single sheet of drawings:

Figure 1 is a view, mainly schematic, of a temperature control system embodying my invention;

Fig. 2 is a fragmentary view of the mechanism shown in front elevation in Fig. 1, as seen in lateral section; and Fig. 3 is a schematic diagram of connections of a modified system embodying my invention.

Referring first to Figs. 1 and 2 of the drawing, I have there illustrated an oven casing 11 enclosing a cooking chamber 13 having an electric heating element 15 located therein to heat the same. I have shown the oven and the heating elements schematically only, as the design and construction thereof form no part of my present invention.

A supply circuit for energizing the heating element 15 is constituted by supply-circuit conductors L1 and L2. As it may be desirable to utilize a time-controlled means to start and to stop the operation of the oven, I have shown a clock 17 which controls contact members 19 operatively associated therewith to close and open the circuit as desired by an operator, this being accomplished in a manner now well known in the art.

I provide a pair of parallel-connected circuit-controlling instrumentalities in the form of thermally-actuable switch assemblies, one of these being indicated by the numeral 21 and the other being indicated by the numeral 23. The device 21 may be designated as a single-cycle circuit controller or switch, while device 23 is a plural-cycle switch or circuit controller. The significance of these titles will be more fully brought out hereinafter.

The device 21 includes a mercury switch 25 actuated by a bimetal strip 27, which strip may be of spiral shape substantially as shown in the drawing. One end of the spiral bimetal member 27 is fixed as against a rear plate 29, by a pin 31, while the other end of the spiral is operatively secured to the mercury tube switch 25, all in a manner now well known in the art. The normal or closed position of switch 21 is that shown in the drawing where the tube is substantially horizontal, and it is to be understood that upon an increase of the temperature of the bimetal spiral 27, it will move in such manner as to turn the tube switch 25 in a counterclockwise position, as seen in Fig. 1 of the drawing.

A metal cap 33 is operatively associated with the switch 25 and has a projecting lug 35 which cooperates with a latch 37 pivotally mounted on a pivot shaft 39 to hold switch 21 in its open position after its first actuation thereto. A spring 41 cooperates with arm 37 to pull it against a stop 43 whereby to reduce the friction between the cooperating inclined surfaces of the lower end of latch 37 and of lug 35. The latch thus prevents reclosing of the circuit of the switch 21 by the action of the thermally-actuable member thereof after having been moved into open position thereby.

The second circuit-controlling instrumentality 23 includes a mercury tube switch 45 and a bimetal spiral 47 arranged and operating in substantially the same manner as the corresponding parts 25 and 27 of device 21.

Means for adjusting the respective switches 21 and 23, whereby to vary the temperatures at which they will severally operate to open the circuit, may comprise a hand lever 49 (see Fig. 2) or any other suitable or appropriate means for obtaining the same results, namely, the adjustment of the thermally-actuable circuit controllers to vary their operating temperatures. It is to be particularly noted that such thermally-actuable switches may be purchased in the open market, and it is for this reason that I have elected not to show all of the details of these devices, but rather to show only sufficient structure to indicate the general construction and to describe the desired operating characteristics of these several circuit controlling instrumentalities.

As shown schematically in the drawing, the two devices 21 and 23 may be located in a suitable metal casing 51, which may be secured in proper position within the oven chamber 13, as by machine screws 53, the shaft 39 then extending forwardly of the oven structure 11, and being provided with a knob 55.

Means for rendering the respective switches 21 and 23 effective and ineffective are provided in duplicate. One means includes a manually operable switch arm 57 operatively associated with device 21 and a manually operable switch arm 59 associated with device 23. Additional means for rendering the respective switches ineffective include a manually adjustable lever arm 61 associated with device 21 and a similar arm 63 associated with device 23. These arms are each individually pivotally mounted and a short actuating shaft 65 is associated with each extending through the front wall of the oven where it is provided with an actuating knob 67.

Means to energize and deenergize the circuit of the heating element 15, irrespective of the clock 17, may be provided in the form of a manually actuable switch which is here shown as two switch arms 71 and 73, although, of course, I may use any other form of circuit-controlling means, such as a snap switch.

I wish to point out here that the devices 21 and 23 just described are connected in parallel circuit relation with one another, so that they severally control the circuit of the heating element in a manner to be hereinafter set forth. In other words, each mercury switch controls directly the circuit of the heating element without the use of any intermediate circuit-controlling devices. Where the heating element is of relatively large capacity, that is, where it is desired to carry 20 to 40 amperes at 110 volts, the mercury switches must, of course, each be of corresponding current-carrying capacity.

It may be desirable, therefore, to arrange for the use of smaller mercury switches, and a system whereby this can be effected is shown in Fig. 3 of the drawing. The supply circuit is again indicated by conductors L1 and L2, the heating element being indicated as before by numeral 15. The circuit of heating element 15 is controlled by a contactor 81, including a coil 83, a movable armature core 85, a contact bridging member 87, and two spaced cooperating contact members 89 connected in circuit with heating element 15. A contactor of this kind is well known in the art, and can be made at a relatively small cost.

Means for controlling the energization of actuating coil 83 of contactor 81 includes a single-cycle thermally-actuable switch assembly 91 and a plural-cycle thermally-actuable switch assembly 93, these being substantially the same as was hereinbefore described in connection with Fig. 1 of the drawing, where similar devices are numbered 21 and 23, respectively. In view of the similarity of devices 91 and 93 to devices 21 and 23, it is believed unnecessary to further describe these switches in detail, except to state that the current-carrying capacity of these mercury switches may now be measured in terms of one ampere or less, this being the amount of current usually required for an actuating coil of a contactor.

Means for rendering the respective switches 91 and 93 effective and ineffective at the will of an operator may include a manually operable switch 95 in circuit with the switch 91 and the manually operable switch 97 in circuit with switch 93. It is obvious that the system of Fig. 3 utilizes relatively small capacity mercury switches in combination with two contactors, whereas the system shown particularly in Fig. 1 of the drawing uses mercury switches of higher current-carrying capacity.

I wish to point out here that while I have illustrated and described mercury switches actuated by a bimetal element, I do not wish to be limited thereto, and it is obvious that any form of thermally-actuable circuit controlling means may be utilized, so long as one of the circuit-controlling devices is a single-cycle switch, which is latched open after its first movement to open position, while the second switch is a plural-cycle switch operative continuously until deenergization of the entire system is effected.

As has already been set forth, one of the time-temperature cycles which it is desired to obtain with the two instrumentalities hereinbefore described includes a substantially momentary peak temperature on the order of 500° F. or over followed by a sustained or maintained lower temperature on the order of 300° F. or so. Device 21 or device 91, as the case may be, is adjusted so that it will operate to open its circuit at about 500° F. while device 23, or device 93, is adusted to operate to open its circuit at about 300° F.

Assuming that the above-mentioned adjustments have been made, and that it is desired to obtain the momentary peak and the lower maintained temperature cycle, switches 57 and 59 of Fig. 1 are both closed manually, and if the main circuit-energizing switch (members 71 and 73) is also closed, the heating element 15 will be energized, assuming, of course, that the contacts 19 have been closed either manually or by the clock 17, so that the chamber temperature will increase. At a temperature of 300° F. switch 23 is moved to open position, but since switch 21 is still in its closed position, energization of the heating element 15 continues without any change. However, at a temperature of 500° F., switch 21 is moved to open position and is then held in such position by reason of the latch 37. The heating element 15 is then deenergized, and the temperature in the cooking chamber gradually decreases from the momentary peak temperature of 500° F. When the chamber temperature reaches a value of about 300° F., switch 23 is moved to its closed position so that the heating element 15 is re-energized, thereby causing an increase in the chamber temperature. At a certain slightly higher temperature in the cooking chamber, switch 23 is again moved to open position, and it is, of course, understood that there may be a small temperature differential between the open and the closed positions of switch 23, this temperature differential depending entirely upon the design of the switch. In other words, an average temperature of approximately 300° F. will be maintained in the cooking chamber as long as the energizing circuit is otherwise closed.

Let it be assumed that we desire to obtain a peak temperature cycle only, the operator can then use either switch 59 associated with device 23 or the mechanical moving means 63 associated with device 23 to render switch 23 ineffective. If switch 59 is opened, the circuit through mercury switch 45 is, of course, interrupted, and if arm 63 is turned so as to turn switch 45 on its pivot and into open position, the same result is obtained. The heating element 15 is now controlled solely by the device 21, which interrupts the circuit through the heating element at about 500° F. and is then latched in its open position, whereafter the cooking chamber cools gradually by radiation of heat therefrom.

Let it be assumed that it is desired to operate the oven at a substantially constant but lower maintained temperature, the operator may open switch 57 or turn arm 61 to render device 21 ineffective. Energization of the heating element 15 is now controlled solely by switch 23, which intermittently sequentially energizes and deenergizes the heating element 15 to maintain a substantially constant average temperature of, say, 300° F. in the oven chamber.

Substantially the same comments hold in regard to the system shown in Fig. 3 of the drawing, where the respective thermally-actuable switches 91 and 93 severally control the circuit of contactor coil 83, which in turn, through its contact members and contact bridging member, controls the circuit of heating element 15.

The device and system embodying my invention thus provides very simple, relatively inexpensive, and easily installed circuit-controlling instrumentalities for so controlling the energization of the heating element, at the will of an operator, as to permit of obtaining any one of a number of different temperature cycles in a cooking chamber. The respective circuit controlling switches are easily obtained in the open market or modified.

Various further modifications may be made in the device embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and an electric heater therefor, a unitary thermally-actuable circuit controller for the heater responsive to chamber temperature and operable to open position at a certain temperature, a second unitary thermally-actuable circuit controller responsive to chamber temperature and operable to open position at a higher temperature than the first-named circuit controller, said second controller being electrically connected in parallel to the first-named controller thereby to automatically continue energization of the heating element to provide a lower temperature in said chamber after movement of said second controller to open position, and means operatively associated with the second circuit controller to hold it in said open position once it has been moved thereinto.

2. In an electric cooking appliance including a cooking chamber and an electric heating element therefor, a thermally-actuable switch movable in response to variations in chamber temperature connected in the circuit of the heating element and operable to open position at a certain temperature, a second thermally-actuable switch movable in response to variations in chamber temperature and operable to open position at a higher temperature than the first-named switch, said second switch being electrically connected in parallel with the first switch thereby to automatically continue energization of the heating element to provide a lower temperature in said chamber after movement of the first switch to open position, and manually-operable latching means associated with the first switch to hold it in open position after having been moved into such position.

3. In an electric cooking appliance including a cooking chamber and a heating element therefor, a pair of unitary thermally-actuable switches severally controlling the energization of the heating element, said switches being operable in response to variations in chamber temperature and one of said switches being operable at a higher temperature than the other, electric connections between the two switches whereby the initial control of the heating element is effected by the switch operable at the higher temperature, and means operatively associated with the switch operable at higher temperature to render it ineffective after its first operation to open position and to transfer the control of the heating element to the switch operable at lower temperature.

4. In an electric cooking appliance including a cooking chamber and a heating element therefor, control means for the heating element to obtain a peak temperature and then a maintained temperature cycle in the cooking chamber, said means comprising a first thermally-actuable switch for the heating element, movable in response to variations in chamber temperature and operable at a certain temperature, a second thermally-actuable switch for the heating element movable in response to variations in the chamber temperature and operable at a higher temperature than the first switch, electric connections between the two switches to cause the second switch to control the heating element until a peak chamber temperature has been reached, and means to render the second switch ineffective after its first operation to open position, the first switch thereafter sequentially energizing and deenergizing the heating element to maintain a lower temperature in the cooking chamber.

5. In an electric cooking appliance including a cooking chamber and a heating element therefore, means for obtaining any one of three temperature cycles in the cooking chamber, said means comprising a first thermally-actuable switch responsive to chamber temperature controlling the energization of the heating element and operable at a certain temperature, a second thermally-actuable switch also controlling the energization of the heating element and operable at a higher temperature than the first switch, manually-releasable latching means associated with the second switch to hold it in open position after it has been moved into such position, and means associated with the respective switches for rendering them ineffective to control the heating element, whereby upon rendering effective the second switch a peak temperature cycle is obtained, upon rendering effective the first switch only a maintained lower temperature cycle is obtained and whereby upon rendering both switches effective a combined initial peak temperature and a subsequent maintained lower temperature cycle is obtained in a cooking chamber.

6. A device as set forth in claim 4, in which the means rendering the second switch ineffective is a latch cooperating with the switch to hold it in open position.

7. A device as set forth in claim 4, in which the means rendering the second switch ineffective is a manually operable latch cooperating with the switch to hold it in open position after its first operation to such position.

8. In an electric cooking appliance including a cooking chamber and a heating element therefor, a unitary single-cycle thermally-actuable switch assembly for controlling the energization of the heating element and operable at a peak temperature in the cooking chamber, a unitary plural-cycle thermally-actuable switch assembly for controlling the energization of the heating element and operable at a lower temperature in the cooking chamber, and electric conductors connecting said switches in parallel with each other and in circuit with the heating element, whereby the single-cycle switch controls the energization of the heating element until a peak temperature is reached in the cooking chamber when the heating element is deenergized after which the plural-cycle switch intermittently sequentially energizes and deenergizes the heating element to maintain a lower temperature in the cooking chamber.

9. In an electric cooking appliance including a cooking chamber and a heating element therefor, means for controlling the energization of the heating element to obtain a peak temperature and then a maintained lower temperature in the cooking chamber, said means comprising a single-cycle peak temperature thermally-actuable unitary switch assembly responsive to chamber temperature and a plural-cycle maintained lower temperature thermally actuable unitary switch assembly responsive to chamber temperature, conductors connecting said switches in parallel with each other and to control the heating element, said single-cycle peak temperature switch controlling the energization of the heating element until a peak temperature in the cooking chamber is reached then moving to and remaining in open position whereafter the maintained lower temperature switch intermittently sequentially energizes and deenergizes the heating element to maintain a lower temperature in the cooking chamber.

10. A device as set forth in claim 4, in which the means rendering the respective switches ineffective are manually-actuable means for moving the switches to open position.

11. In an electric cooking appliance including a cooking chamber and a heating element therefor, a thermally-actuable unitary switch assembly responsive to chamber temperature controlling the energization of the heating element and operable at a peak chamber temperature, a second thermally-actuable unitary switch assembly responsive to chamber temperature controlling the energization of the heating element and operable at a lower maintained chamber temperature, conductors connecting the two switches in parallel with each other, a manually-releasable latch for the peak temperature switch to hold it in open position after it has moved into such position, and means operatively associated with the respective switches to render them effective and ineffective at the will of an operator, whereby upon rendering both switches effective a momentary peak temperature in the chamber and then a lower maintained temperature therein is obtained, and upon rendering effective the maintained temperature switch assembly only a substantially constant lower maintained temperature in the chamber is obtained.

12. In an electric cooking appliance including a cooking chamber and a heating element therefor, means for controlling the heating element to obtain a peak temperature and then a maintained lower temperature in the cooking chamber, said means comprising a first thermally-actuable unitary switch for the heating element, movable in response to variations in chamber temperature and operable at substantially the desired maintained temperature value, a second thermally-actuable unitary switch for the heating element, movable in response to variations in chamber temperature and operable at a desired peak temperature, electric conductors connecting the two switches in parallel with each other and means associated with the second switch to prevent reclosing thereof after its first operation to open position.

HERMAN M. BIEBEL.